(12) United States Patent
Ilkovic

(10) Patent No.: US 10,035,528 B2
(45) Date of Patent: Jul. 31, 2018

(54) CART SYSTEM FOR HOLDING AND RETAINING PORTABLE BALL HOPPERS

(71) Applicant: Rastislav Ilkovic, Langhorne, PA (US)

(72) Inventor: Rastislav Ilkovic, Langhorne, PA (US)

( * ) Notice: Subject to any disclaimer, the term of this patent is extended or adjusted under 35 U.S.C. 154(b) by 0 days.

(21) Appl. No.: 15/641,252

(22) Filed: Jul. 4, 2017

(65) Prior Publication Data
US 2018/0009456 A1    Jan. 11, 2018

Related U.S. Application Data

(60) Provisional application No. 62/358,567, filed on Jul. 5, 2016.

(51) Int. Cl.
*B62B 3/02*    (2006.01)
*B62B 3/00*    (2006.01)

(52) U.S. Cl.
CPC .......... *B62B 3/005* (2013.01); *B62B 2202/40* (2013.01); *B62B 2301/04* (2013.01)

(58) Field of Classification Search
CPC .......... B62B 3/005; B62B 3/002; B62B 3/10; B62B 3/104; B62B 2202/40; B62B 2202/12; B62B 2301/04; B62B 2301/046; B62B 2301/0465; B62B 2301/0467
USPC ....................................................... 280/79.2
See application file for complete search history.

(56) References Cited

U.S. PATENT DOCUMENTS

| | | | |
|---|---|---|---|
| 4,383,695 A | 5/1983 | Ray | |
| 4,412,697 A * | 11/1983 | Verde | A63B 47/02 294/19.2 |
| 4,844,527 A | 7/1989 | Ray | |
| 5,464,262 A | 11/1995 | Madrazo | |
| 5,507,541 A | 4/1996 | Chen et al. | |
| 6,142,544 A | 11/2000 | Benzoni et al. | |
| 6,354,643 B1 | 3/2002 | Podejko | |
| 6,412,839 B1 | 7/2002 | Tran | |
| 6,513,845 B2 * | 2/2003 | Campomane | A63B 47/02 206/315.9 |
| 7,954,830 B2 * | 6/2011 | Begin | B62B 3/04 280/47.35 |
| 8,141,919 B2 | 3/2012 | Turdo | |
| 9,139,331 B2 * | 9/2015 | Tavolino | B65D 7/12 |
| 2006/0097468 A1 | 5/2006 | Sugrue | |
| 2009/0295108 A1 | 12/2009 | Oku | |
| 2010/0193379 A1 | 8/2010 | Matthews | |
| 2014/0356114 A1 | 12/2014 | Budacsek | |

* cited by examiner

*Primary Examiner* — John D Walters
(74) *Attorney, Agent, or Firm* — LaMorte & Associates, P.C.

(57) ABSTRACT

A cart assembly that is designed to hold and transport one or more ball hoppers. The ball hoppers have baskets that are supported by legs. The baskets are configured to hold some type of ball, such as a tennis ball or a golf ball. The cart assembly can transport the ball hoppers as they are standing on legs. The cart assembly has a platform that is supported by wheels. The wheels provide the platform with the ability to roll. Receptacles are present on the platform. The receptacles are sized, shaped and positioned to receive the legs of a ball hopper when the ball hopper is placed on the platform. Once a ball hopper is attached to the platform, the ball hopper becomes part of the cart assembly and can roll with the cart assembly from point to point.

20 Claims, 8 Drawing Sheets

CART SYSTEM FOR HOLDING AND RETAINING PORTABLE BALL HOPPERS

RELATED APPLICATIONS

This application claims the benefit of U.S. Provisional Patent Application No. 62/358,567, filed Jul. 5, 2016.

BACKGROUND OF THE INVENTION

1. Field of the Invention

In general, the present invention relates to wheeled carts that are specifically designed to transport specific items. More particularly, the present invention relates to wheeled carts that are designed to hold portable ball hoppers, such as those used to hold tennis balls.

2. Prior Art Description

Different sports require different equipment. Often the equipment needed to play a sport is heavy or cumbersome. Accordingly, it cab be difficult to transport some sports equipment to a court or field of play. In recognition of this problem, there have been many carts and wagons designed to retain and transport specific sports equipment. Heavy sports equipment, such as golf clubs, are typically carried using a wheeled cart. Lighter sports equipment, such as tennis rackets, are often carried in shoulder bags. Such specialized carts and bags are usually designed to carry the basic equipment needed for one person to play the sport. A problem only occurs when a person carries unusual equipment, or if the person is a coach and needs to carry equipment beyond what is needed for one person to play the sport.

For instance, a tennis coach may carry rackets in a traditional tennis bag. However, a traditional tennis bag may only be able to hold a few tennis balls. A tennis coach may need dozens or even hundreds of tennis balls in order to train and drill multiple tennis players. As such, other carrier equipment is needed.

In the sport of tennis, large numbers of tennis balls are typically carried in tennis ball hoppers. A tennis ball hopper has a basket that can hold a few dozen balls. However, when filled with balls, the tennis hopper can be heavy and difficult to carry. Furthermore, if a tennis coach needs more than one ball hopper to run drills on multiple courts, the weight and bulk of the ball hoppers often cause a coach to move only ball hoppers one at a time. This takes significant time and labor.

In the prior art, the transportation of a tennis ball hopper has been made easier by the addition of wheels to the tennis ball hopper. Such prior art solutions are exemplified by U.S. Pat. No. 6,412,839, and U.S. Pat. No. 8,141,919. The problem with such prior art devices is that the attachment of the wheels to the ball hopper blocks openings in the bottom of the hopper and detracts from the ability of the ball hopper to receive balls. Furthermore, the addition of the wheels makes the ball hopper heavier. Accordingly, although the wheels may be useful in rolling the ball hopper around on a court, the wheels make it more difficult for a coach or player to transport multiple hoppers and other equipment.

A need therefore exists for a system that can be used to transport multiple hoppers and other equipment with reduced effort. A need also exists for a system that enables ball hoppers to be quickly and easily attached and detached from the system for use on different courts of play. These needs are met by the present invention as described and claimed below.

SUMMARY OF THE INVENTION

The present invention is a cart assembly that is designed to hold and transport one or more ball hoppers. The ball hoppers have baskets that are supported by legs. The baskets are configured to hold some type of ball, such as a tennis ball or a golf ball. The cart assembly can transport the ball hoppers as they are standing on legs.

The cart assembly has a platform that is supported by wheels. The wheels provide the platform with the ability to roll. Receptacles are present on the platform. The receptacles are sized, shaped and positioned to receive the legs of a ball hopper when the ball hopper is placed on the platform. Once a ball hopper is attached to the platform, the ball hopper becomes part of the cart assembly and can roll with the cart assembly from point to point.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system can be embodied to hold many types of ball hoppers, such as golf ball hoppers, the embodiment illustrated shows a cart assembly that is being used to hold commercially available tennis ball hoppers. This embodiment is selected in order to set forth one of the best modes contemplated for the invention. The illustrated embodiment, however, is merely exemplary and should not be considered a limitation when interpreting the scope of the claims.

Figure 1:
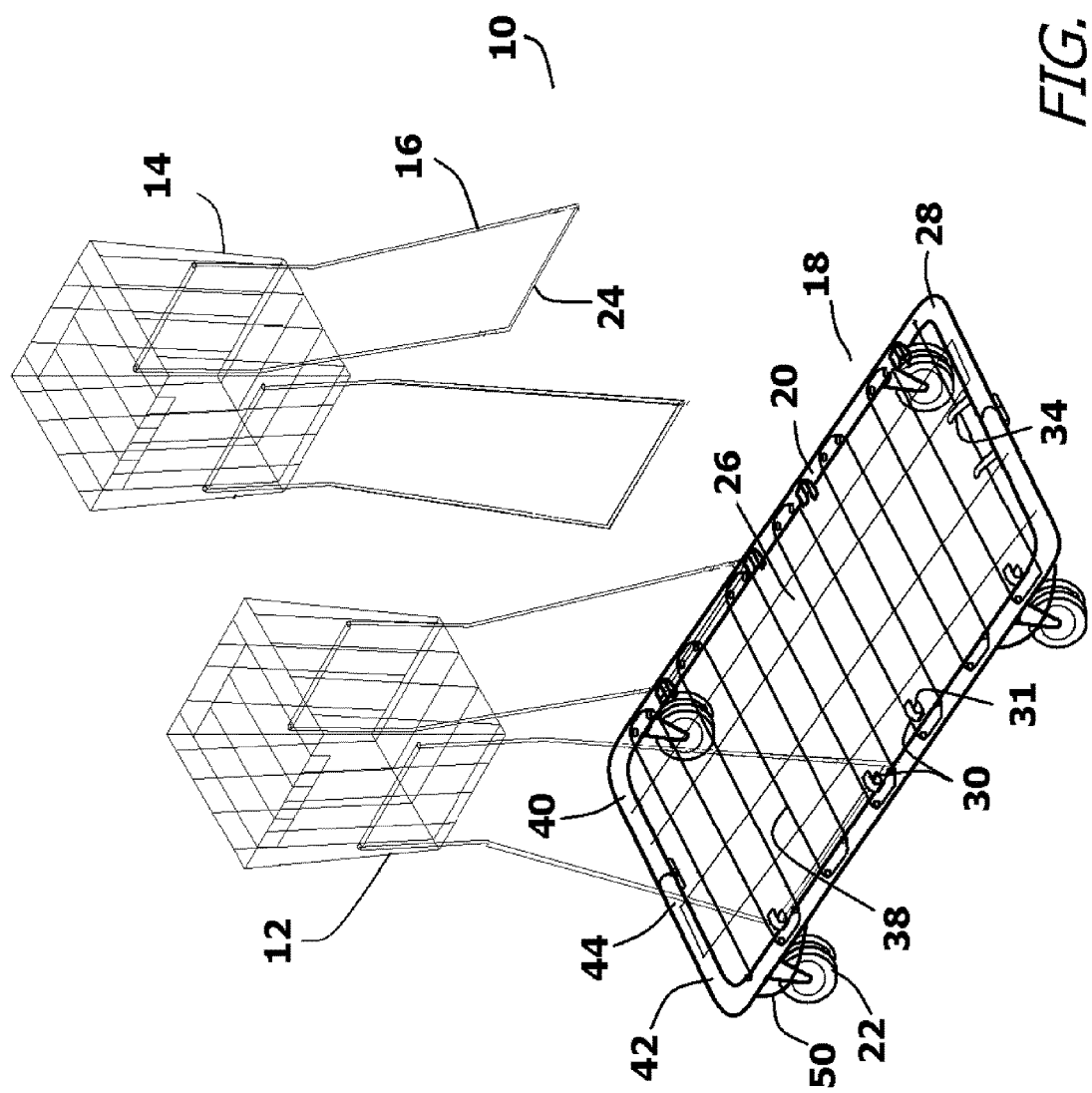
FIG. 1 is a perspective view of an exemplary embodiment of a cart assembly shown in conjunction with a tennis ball hopper.
Figure 2:
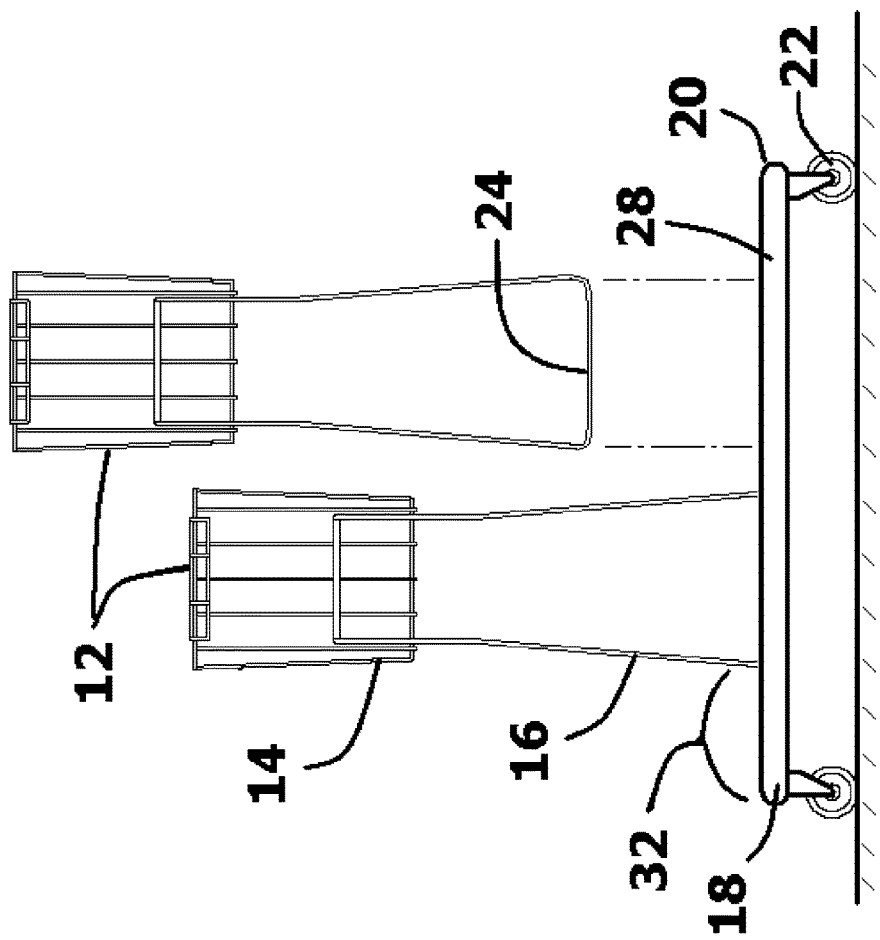
FIG. 2 is a side view of the exemplary cart assembly shown holding two tennis ball hoppers.

Referring to FIG. 1 and FIG. 2, a system 10 is shown that supports and retains one or more prior art ball hoppers 12. The ball hoppers 12 are commercially available products that are configured as a basket 14 with folding legs 16. The folding legs 16 serve as both the handles of the basket 14 and the legs of the basket 14, depending upon how the folding legs 16 are positioned.

The system 10 utilizes a cart assembly 18. The cart assembly 18 has a platform 20 that is supported by wheels 22. The wheels 22 preferably swivel. However, it is preferred that at least two of the wheels 22 have the ability to be locked in a fixed direction, as will later be explained. The wheels 22 enable the cart assembly 18 to roll over surfaces, such as parking lots and tennis courts.

The folding legs 16 of the prior art ball hopper 12 are generally U-shaped and have a horizontal section 24 at the point furthest from the basket 14. The horizontal section 24 typically has a length of between eight inches and twelve inches, depending upon the manufacturer. The folding legs 16 are typically made of a thick gauge wire, that has a diameter of between $1/16^{th}$ of an inch and $1/4$ of an inch.

The platform 20 of the present invention cart assembly 18 creates a support surface 26 suspended within a framework 28. As such, the framework 28 forms the periphery around the support surface 26. Leg receptacles 30 are anchored in opposing positions on the framework 28. Each of the leg receptacles 30 has a U-shaped opening 31 that is sized, shaped, and positioned to receive and retain a portion of the horizontal section 24 of the folding legs 16. Once mounted to the framework 28, the U-shaped opening 31 of each leg receptacle 30 extends inwardly toward the center of the platform 20. The leg receptacles 30 can be mounted to multiple points along the framework 28. The position of the leg receptacles 30 is dependent upon the brand and model of the hopper 12 being supported. Preferably, at least two leg receptacles 30 engage the horizontal section 24 of each folding leg 16. As the horizontal section 24 of the folding legs 16 passes under the leg receptacle 30, the folding legs 16 are prevented from tilting or otherwise lifting away from the platform 20. The leg receptacles 30 are spaced to be slightly closer together than are the folding legs 16 of the ball hopper 12. Accordingly, the folding legs 16 must be slightly deformed to engage the leg receptacles 30. This creates spring energy in the folding legs 16 that biases the horizontal sections 24 of the folding legs 16 into the leg receptacles 30 with a slight spring bias.

When the folding legs 16 of the hopper 12 are positioned as legs, it can be seen that the two folding legs 16 are engaged by the leg receptacles 30 on the opposing side of the framework 28. This locks the folding legs 16 into fixed positions on the platform 20. The folding legs 16 remain locked in place as the cart assembly 18 is rolled. Likewise, the folding legs 16 remain in fixed positions if any part of the ball hopper 12 is accidentally struck by a tennis ball during play.

Accordingly, it will be understood that the cart assembly 18 can support ball hoppers 12 and enable the ball hoppers 12 to be rolled around a tennis court or similar surface. While on the cart assembly 18, the folding legs 16 of each ball hopper 12 are locked in place until they are manually retracted from the leg receptacles 30. Since the folding legs 16 are locked in place, the folding legs 16 are prevented from collapsing or tilting. The cart assembly 18, therefore, acts as the base of the ball hoppers 12, therein adding great stability and mobility to the ball hoppers 12.

Figure 3:
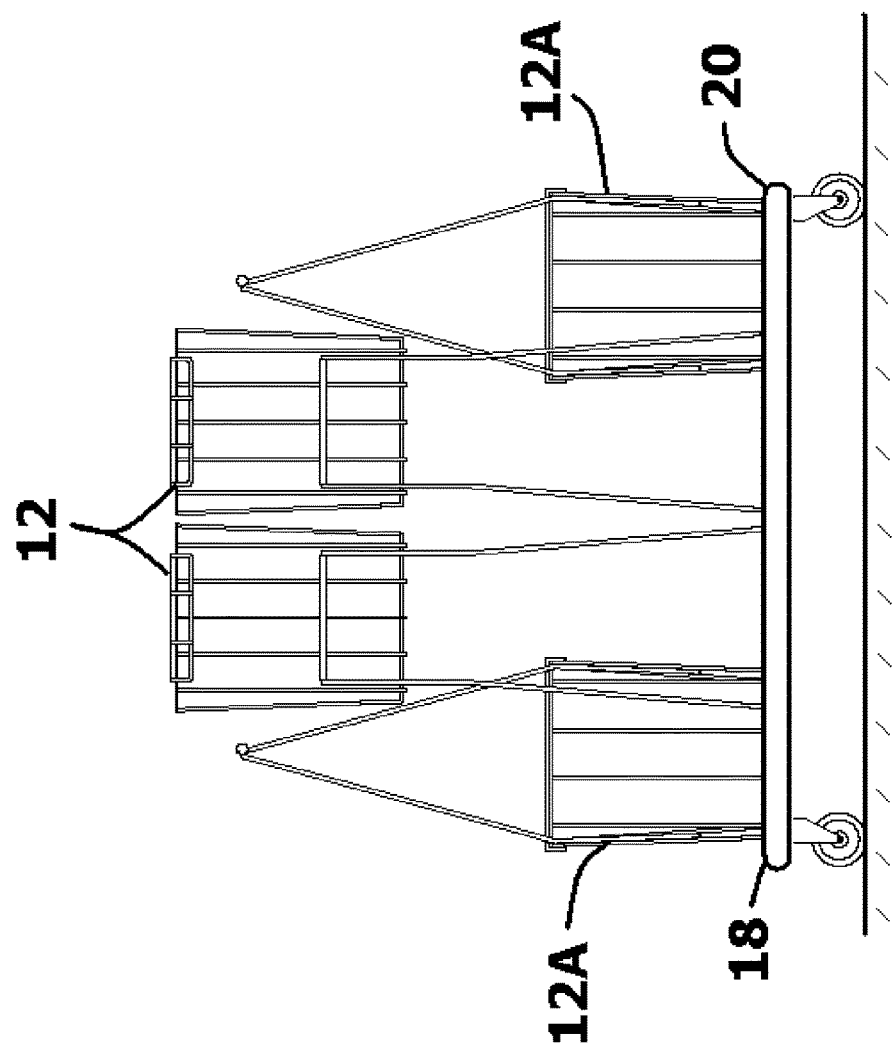
FIG. 3 is a side view of the exemplary cart assembly shown holding four tennis ball hoppers.

Referring to FIG. 3 in conjunction with FIG. 2, it can be seen that extra areas 32 can be provided on the platform 20. The extra areas 32 enable extra ball hoppers 12A to be transported on the cart assembly 18, even while the main ball hoppers 12 are locked into position on the cart assembly 18. The extra area 32 can also be used to transport other related equipment, such as tennis rackets, equipment bags, water containers and the like.

Figure 4:
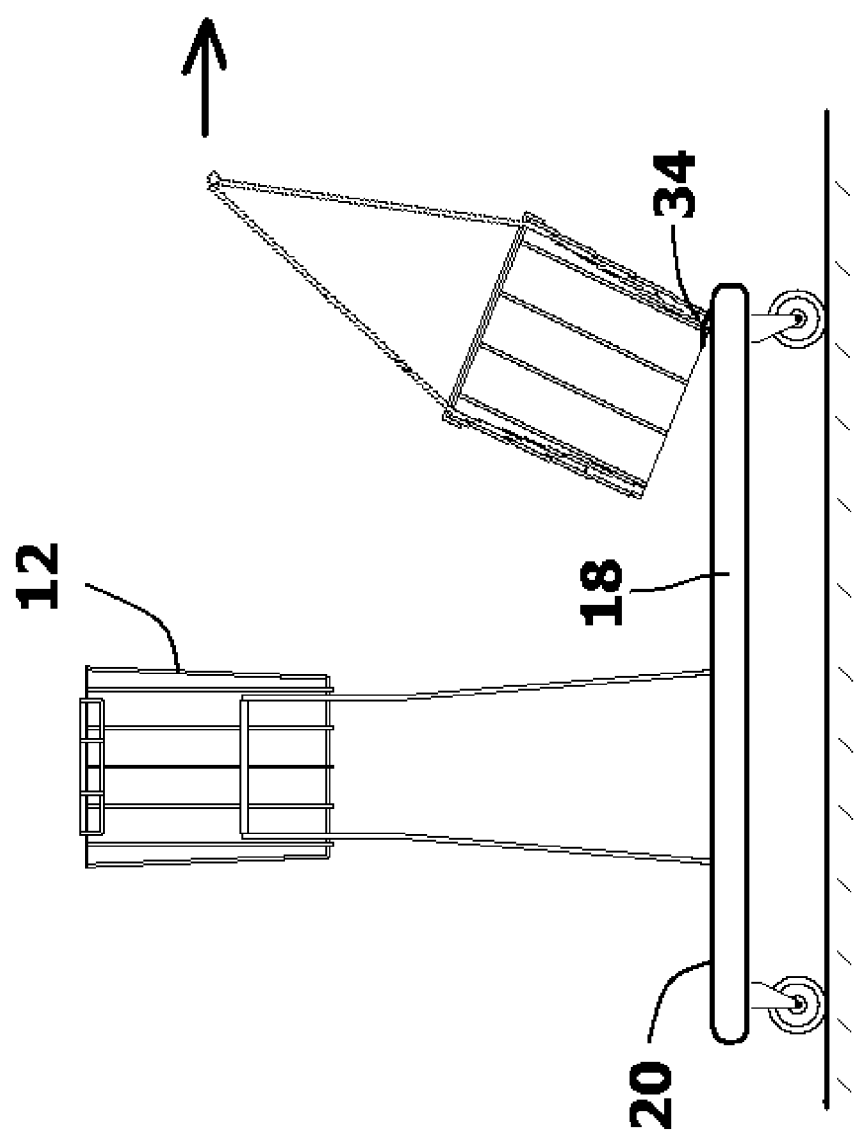
FIG. 4 is a side view of the exemplary cart assembly being towed by a tennis ball hopper.

Referring to FIG. 4 in conjunction with FIG. 1, it will be understood that the cart assembly 18 lacks a handle for pulling or pushing the cart assembly 18. Rather, the cart assembly 18 includes basket hooks 34 along at least one end.

The basket hooks 34 are capable of engaging the basket 14 of the ball hopper 12 when the legs 16 of the ball hopper 12 are folded into a handle. In this manner, the ball hopper 12 is attached to the cart assembly 18 and the ball hopper 12 can be used as a handle to push or pull the cart assembly 18. The structure of the hopper 12 can also be used to pull and lift the cart assembly 18 over obstacles, such as curbs. The pulling of the cart assembly 18 is made smooth by having the wheels at the front of cart assembly 18 free to swivel and locking the rear wheels into a fixed straight direction.

Figure 5:
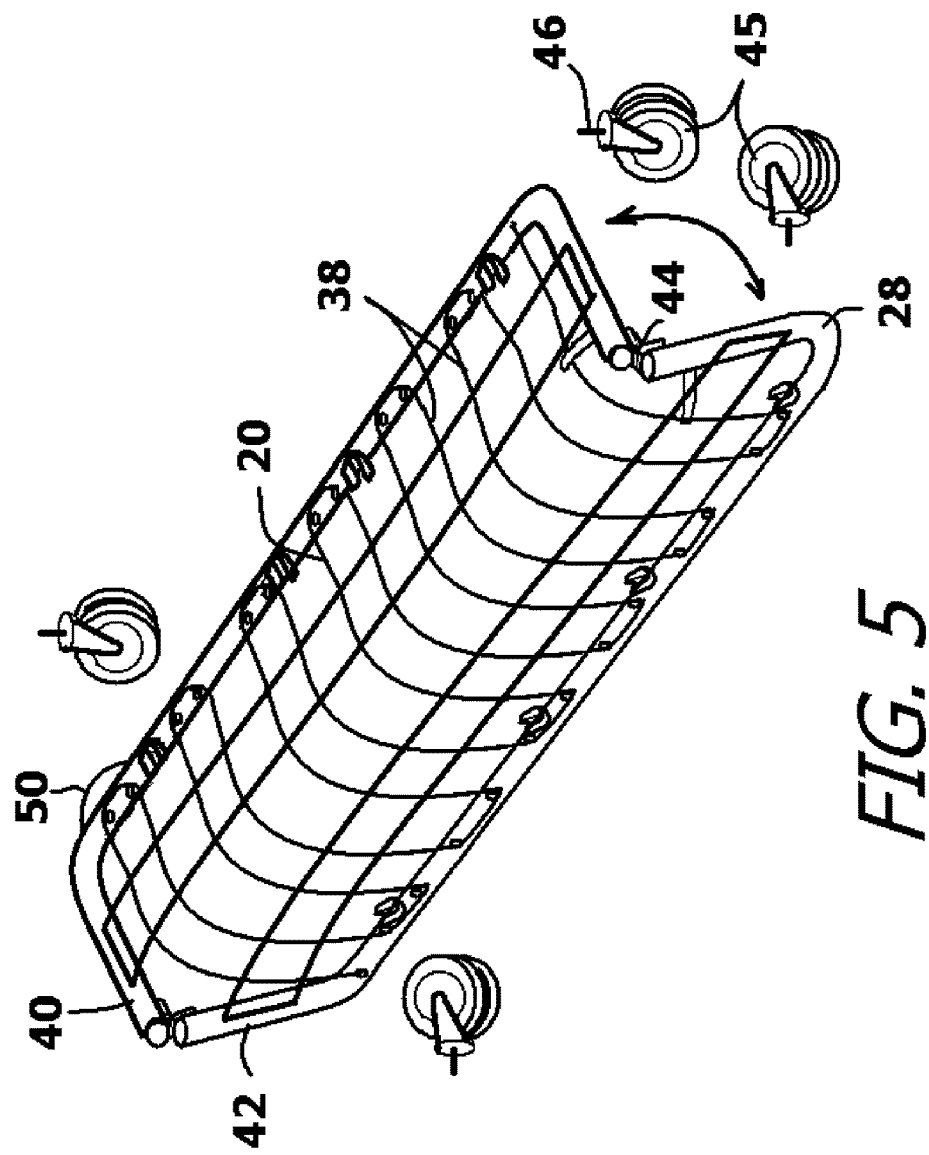
FIG. 5 shows the exemplary cart assembly in a partially folded configuration.

Referring to FIG. 5 in conjunction with FIG. 1, an exemplary construction for the cart assembly 18 is shown. In this construction, the cart assembly 18 presents a framework 28 that supports a platform 20. The platform 20 is flexible and can be made of flexible netting or a similar material. In the illustrated embodiment, the platform 20 is a netted structure created by cords 38 that are woven back and forth across the framework 28.

The framework 28 itself is made from two mirrored frame sections 40, 42 that are joined together at hinge joints 44. The hinge joints 44 enable the framework 28 to be selectively folded in half for easy storage. However, when fully opened, the two frame sections 40, 42 are biased into the plane of the open position by the tension in the material of the cords 38.

Figure 6:
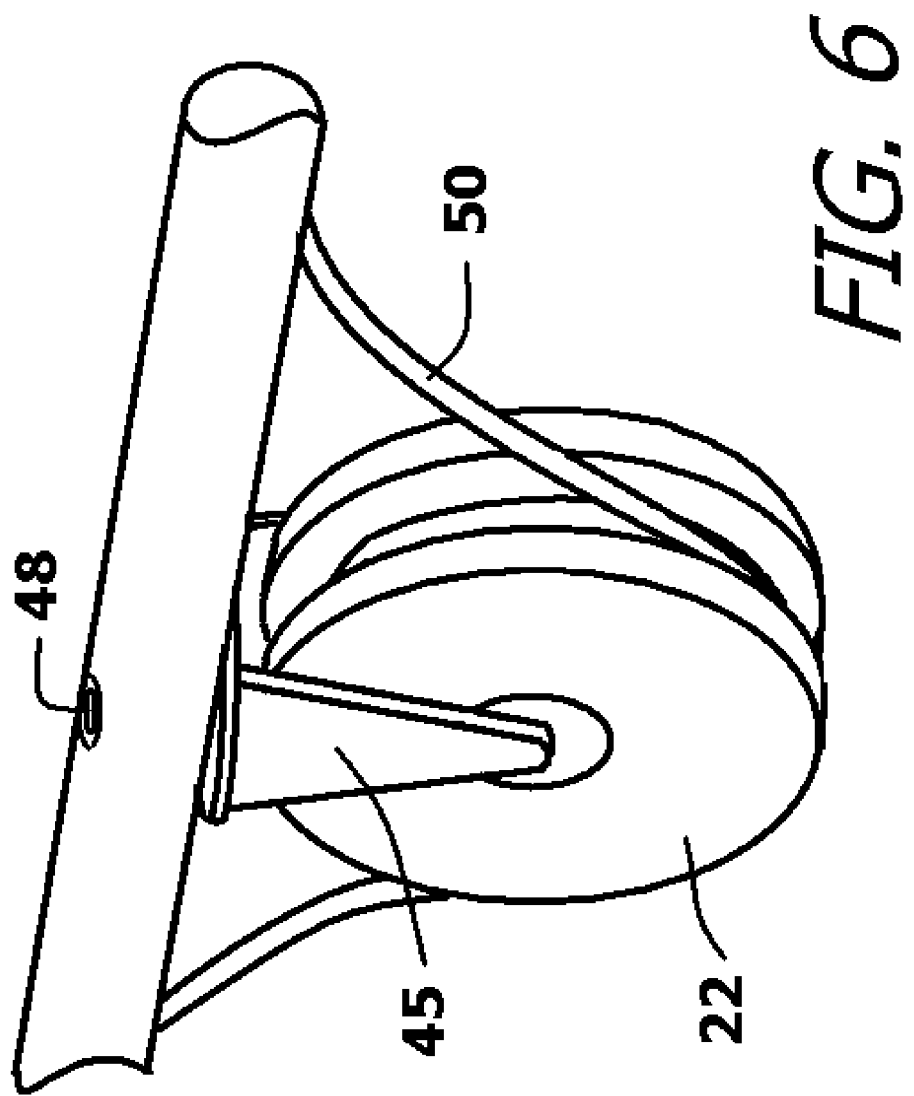
FIG. 6 shows a wheel assembly on the framework being engaged by an elastic band to be oriented in a forward direction.
Figure 7:
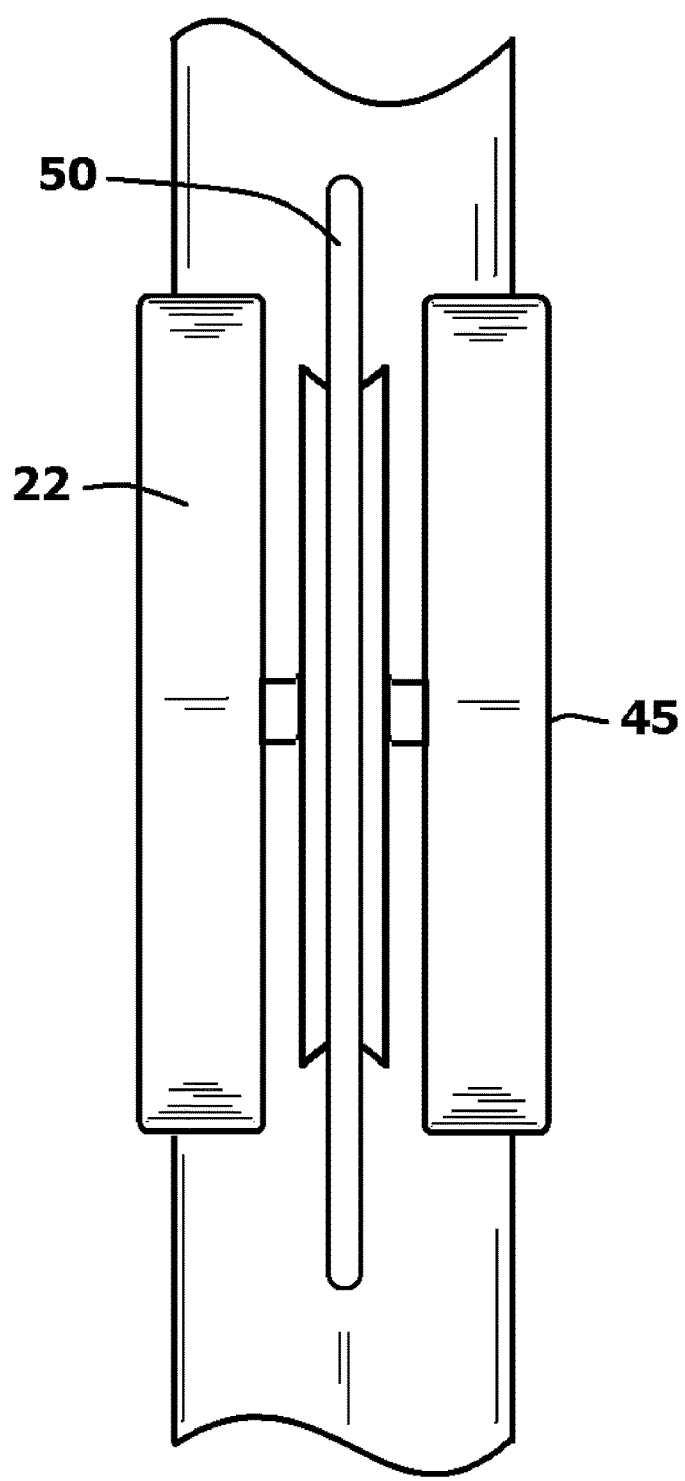
FIG. 7 shows a bottom view of the wheel assembly shown in FIG. 6.

Referring to FIG. 6 and FIG. 7 in conjunction with FIG. 5, it will be understood that the wheels 22 that support the framework 28 are preferably commercial caster assemblies 45. The caster wheel assemblies 45 can be selectively detached from the framework 28 for easy storage and packaging. The caster assemblies 45 can be locking caster assemblies that can be locked into a selected direction when desired. However, in the illustrated embodiment, the caster assemblies 45 are free moving casters that can roll in any direction. The caster assemblies 45 have posts 46 that engage mounting holes 48 in the framework 28.

Short lengths of elastic cordage 50 can be mounted to the framework 28 proximate each mounting hole 48. The cordage 50 extends across the area occupied by the underside of the mounting holes 48. If it is desired to lock a caster assembly 45 in a forward direction, the elastic cordage 50 need only be stretched across the caster assembly 45. The elastic cordage 50 engages the caster assembly 45 and prevents the caster assembly 45 from moving out of a straight orientation. This is shown in FIG. 6 and FIG. 7.

Figure 8:
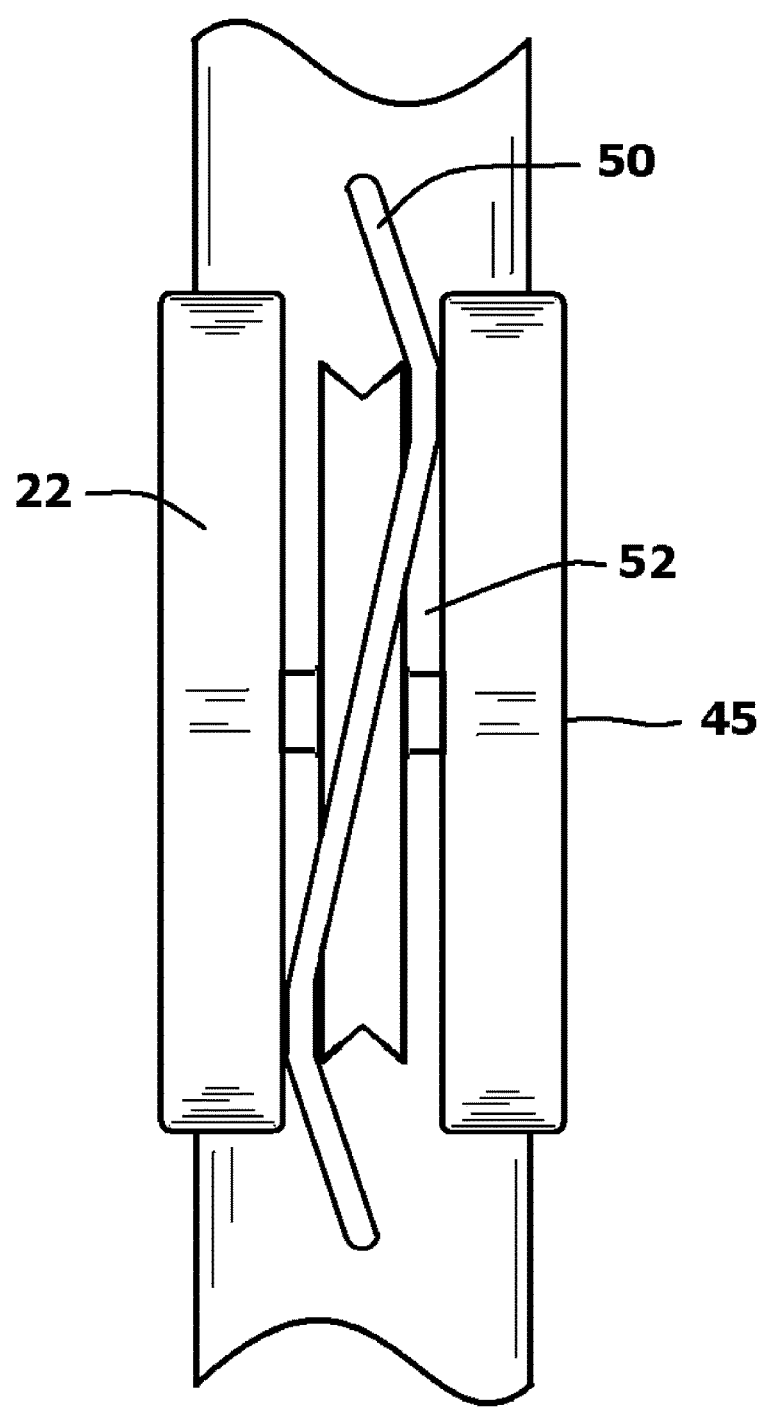
FIG. 8 shows a wheel assembly on the framework being engaged by an elastic band to be locked in place as a brake.

Referring to FIG. 8, it will be understood that to lock the caster assembly 45 in place, the elastic cord 20 can be extended into the gaps 52 in between the wheels 22. The presence of the elastic cord 50 binds the caster assembly 45 and prevents the wheels 22 from turning. This acts as a brake to hold the overall cart assembly in place.

It will be understood that the embodiment of the present invention that is illustrated and described is merely exemplary and that a person skilled in the art can make many variations to that embodiment. For example, the platform of the cart assembly can be made from many materials. Likewise, the shape and material of the framework can be altered as a matter of design choice. All such embodiments are intended to be included within the scope of the present invention as defined by the appended claims.

What is claimed is:
1. A cart assembly, comprising:
  a ball hopper having a basket supported by legs, wherein said legs of said ball hopper contain horizontal sections;
  a platform;

wheels that support said platform, therein providing said platform with the ability to roll on said wheels; and receptacles on said platform, wherein said receptacles contain openings that receive and retain said horizontal sections of said legs of said ball hopper, therein joining said ball hopper to said platform.

2. The assembly according to claim 1, further including a second ball hopper and hook elements on said platform for selectively engaging a second ball hopper.

3. The assembly according to claim 1, wherein said legs of said ball hopper embody a spring bias that biases said horizontal sections of said legs into said receptacles.

4. The assembly according to claim 1, wherein said platform is comprised of a support surface suspended within a peripheral framework.

5. The assembly according to claim 1, wherein said support surface is a foldable material.

6. The assembly according to claim 5, wherein said support surface is netting.

7. The assembly according to claim 5, wherein said peripheral framework is selectively configurable between an open configuration and a folded configuration.

8. The assembly according to claim 5, wherein said foldable material is pulled in tension when said peripheral framework is in said open configuration.

9. The assembly according to claim 1, wherein said wheels are caster wheels.

10. The assembly according to claim 1, further including a locking mechanism for orienting said caster wheels.

11. The assembly according to claim 10, wherein said locking mechanism includes elastic loops that pass over and orient said caster wheels.

12. A cart assembly for transporting a ball hopper, comprising:

a platform having a support surface suspended within a peripheral framework;

wheels that support said framework;

opposing receptacles mounted to said peripheral framework that are configured to engage said ball hopper, said opposing receptacles having openings that face inwardly from said peripheral framework; and hooks, separate and distinct from said opposing receptacles, mounted to said framework, wherein said hooks are configured to engage said ball hopper when oriented at an angle to said platform.

13. The assembly according to claim 12, wherein said platform is comprised of a support surface suspended within a peripheral framework.

14. The assembly according to claim 13, wherein said support surface is a flexible material.

15. The assembly according to claim 14, wherein said support surface is netting.

16. The assembly according to claim 14, wherein said peripheral framework is selectively configurable between an open configuration and a folded configuration.

17. The assembly according to claim 14, wherein said flexible material is pulled in tension when said peripheral framework is in said open configuration.

18. The assembly according to claim 12, wherein said wheels are caster wheels.

19. The assembly according to claim 12, further including an elastic loop mounted proximate each of said caster wheels to orient said caster wheels.

20. A cart assembly, comprising:

a ball hopper having a basket supported by legs;

a platform having a support surface suspended within a peripheral framework, wherein said peripheral framework and said support surface are foldable, being selectively configurable between an open configuration and a folded configuration;

wheels that support said platform, therein providing said platform with the ability to roll on said wheels; and receptacles on said platform that engage and retain said legs of said ball hopper, therein joining said ball hopper to said platform.

* * * * *